(12) United States Patent
Chung

(10) Patent No.: US 12,173,765 B2
(45) Date of Patent: Dec. 24, 2024

(54) BRAKE APPARATUS FOR VEHICLE

(71) Applicant: HYUNDAI MOBIS Co., Ltd., Seoul (KR)

(72) Inventor: Soon Oh Chung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 357 days.

(21) Appl. No.: 17/716,582

(22) Filed: Apr. 8, 2022

(65) Prior Publication Data
US 2022/0325765 A1 Oct. 13, 2022

(30) Foreign Application Priority Data

Apr. 12, 2021 (KR) .................. 10-2021-0047231
Apr. 12, 2021 (KR) .................. 10-2021-0047233

(51) Int. Cl.
F16D 55/22 (2006.01)
B60T 1/06 (2006.01)
(Continued)

(52) U.S. Cl.
CPC .............. *F16D 65/66* (2013.01); *B60T 1/065* (2013.01); *F16D 65/183* (2013.01);
(Continued)

(58) Field of Classification Search
CPC ...... F16D 65/66; F16D 55/226; F16D 65/183; F16D 2121/24; F16D 2125/40; F16D 2127/02; B60T 1/065
See application file for complete search history.

(56) References Cited

U.S. PATENT DOCUMENTS 3,900,084 A * 8/1975 Farr ...................... F16D 65/567
188/71.9
4,083,436 A * 4/1978 Straut ..................... B60T 13/12
192/114 R
(Continued)

FOREIGN PATENT DOCUMENTS

CN 103443495 A 12/2013
CN 106438776 A 2/2017
(Continued)

OTHER PUBLICATIONS

Office Action issued in corresponding German Patent Application No. 102022108488.4 on Nov. 23, 2022.
(Continued)

*Primary Examiner* — Nicholas J Lane
(74) *Attorney, Agent, or Firm* — Morgan, Lewis & Bockius LLP

(57) ABSTRACT

A brake apparatus for a vehicle may include: a pair of screw bars located in a caliper body; a pair of nut parts configured to cover outsides of the respective screw bars, engaged with the respective screw bars, and selectively moved toward a brake pad or moved to an opposite side of the brake pad; a pair of piston parts moved with the nut parts, and configured to apply pressure to the brake pad when pressed by the nut parts or remove the pressure applied to the brake pad when a pressing of the nut parts is removed; an elastic spring installed on each of the piston parts, and configured to apply an elastic restoring force to cause the piston part to return to an original position; and a spring retainer mounted on each of the piston parts, and brought into contact with the elastic spring.

12 Claims, 12 Drawing Sheets

(51) Int. Cl.
*F16D 65/18* (2006.01)
*F16D 65/66* (2006.01)
*F16D 55/226* (2006.01)
*F16D 121/24* (2012.01)
*F16D 125/40* (2012.01)
*F16D 127/02* (2012.01)

(52) U.S. Cl.
CPC ........ *F16D 55/226* (2013.01); *F16D 2121/24* (2013.01); *F16D 2125/40* (2013.01); *F16D 2127/02* (2013.01)

(56) References Cited

U.S. PATENT DOCUMENTS

| | | | | |
|---|---|---|---|---|
| 4,428,462 | A | * | 1/1984 | Warwick .................. F16D 65/18 188/347 |
| 4,494,630 | A | * | 1/1985 | Stoka ...................... F16D 65/54 188/196 R |
| 2009/0145701 | A1 | * | 6/2009 | Piccoli .................... F16D 65/18 188/71.8 |
| 2011/0308898 | A1 | * | 12/2011 | Shiraki ................. B60T 13/741 188/72.4 |
| 2015/0308525 | A1 | * | 10/2015 | Kim .................... F16D 65/0068 188/71.8 |
| 2016/0290424 | A1 | * | 10/2016 | Gutelius ............... F16D 65/183 |
| 2019/0063527 | A1 | | 2/2019 | Thomas |
| 2019/0219117 | A1 | * | 7/2019 | Choi ..................... F16D 65/183 |
| 2019/0293160 | A1 | * | 9/2019 | Kamitani ................ F16H 48/11 |
| 2022/0235839 | A1 | * | 7/2022 | Baek ..................... F16D 65/567 |
| 2022/0307563 | A1 | * | 9/2022 | Madzgalla ............ B60T 13/741 |

FOREIGN PATENT DOCUMENTS

| | | |
|---|---|---|
| CN | 107339344 A | 11/2017 |
| CN | 112324822 A | 2/2021 |
| DE | 26 10 651 A1 | 9/1977 |
| DE | 20 2018 100 862 U1 | 4/2018 |
| DE | 10 2018 222 085 A1 | 6/2020 |
| KR | 10-2011-0136419 A | 12/2011 |
| KR | 10-1184206 B1 | 9/2012 |
| WO | 2012/127514 A1 | 9/2012 |

OTHER PUBLICATIONS

Office Action issued Jul. 26, 2023 for corresponding Chinese Patent Application No. 202210353805.9.

* cited by examiner

BRAKE APPARATUS FOR VEHICLE

CROSS-REFERENCE TO RELATED APPLICATION

This application claims priority from and the benefit of Korean Patent Application Nos. 10-2021-0047231 and 10-2021-0047233, filed on Apr. 12, 2021, which are hereby incorporated by reference for all purposes as if set forth herein.

BACKGROUND

Technical Field

Exemplary embodiments of the present disclosure relate to a brake apparatus for a vehicle, and more particularly, to a brake apparatus for a vehicle, which can uniformize surface pressures applied to brake pads through piston parts.

Discussion of the Background

In general, EMB (Electro Mechanical Brake) refers to an electric brake apparatus which converts a rotational force of a driving motor into a linear motion through a screw/nut mechanism without using hydraulic pressure, thereby pressing a piston. When a screw gear is rotated as a gear having increased the rotational force of the driving motor in the EMB, a spindle converts the rotational motion of the screw gear into a linear motion, thereby pressing the piston. The pressed piston applies pressure to a brake pad such that the brake pad is pressed against a brake disk. In the existing electric brake apparatus, however, since a roll back function is degraded because hydraulic pressure is not used, a return force required for the piston to return to the original position after pressing the brake pad becomes insufficient. Thus, the brake disk and the brake pad are not perfectly spaced apart from each other, but come into contact with each other, thereby generating drag torque.

Furthermore, when the existing electric brake apparatus includes a plurality of pistons, surface pressures applied to the brake pad through the pistons are non-uniformized due to errors among the products. In this case, the braking force is reduced. Therefore, there is a need for a device capable of solving the problem.

The related art of the present disclosure is disclosed in Korean Patent No. 10-1184206 entitled "Electro Mechanical Brake System and Method of Controlling the Same" and registered on Sep. 13, 2012.

SUMMARY

Various embodiments are directed to a brake apparatus for a vehicle, which can uniformize surface pressures applied to brake pads through piston parts.

In an embodiment, a brake apparatus for a vehicle may include: a pair of screw bars located in a caliper body, and configured to be rotatable; a pair of nut parts configured to cover outsides of the respective screw bars, engaged with the respective screw bars, and selectively moved toward a brake pad or moved to an opposite side of the brake pad, depending on a rotation direction of the screw bars; a pair of piston parts moved with the nut parts, and configured to cover the respective nut parts and apply pressure to the brake pad when pressed by the nut parts or remove the pressure applied to the brake pad when a pressing of the nut parts is removed; an elastic spring installed on each of the piston parts, and configured to apply an elastic restoring force to cause the piston part to return to an original position; and a spring retainer mounted on each of the piston parts, and brought into contact with the elastic spring.

One of the piston parts may include: a piston body configured to cover the outsides of the respective screw bar and the respective nut part; and a piston protrusion connected to the piston body, configured to press the brake pad, and having the spring retainer mounted on an outside thereof.

The piston protrusion may include: a piston protrusion body connected to the piston body, and having an outside covered by the spring retainer; and a piston protrusion step protruding from a circumference of the piston protrusion body to an outside, and brought into contact with the spring retainer.

The spring retainer may be made of an elastic material, and has a plurality of slots.

The brake apparatus may further include a pair of position adjusters movably coupled to the caliper body, brought into contact with the pair of nut parts, respectively, and moved on the caliper body toward the brake pad or moved to the opposite side of the brake pad to adjust a position of at least one of the pair of nut parts.

One of the position adjusters may have a first screw thread provided on an outside thereof, and the caliper body may have a second screw thread engaged with the first screw thread.

One of the nut parts may include: a nut body engaged with the respective screw bar; and a nut block connected to the nut body, and brought into contact with the respective position adjuster.

The respective position adjuster may have an insertion groove into which the nut block is inserted.

In an embodiment, a brake apparatus for a vehicle may include: a pair of screw bars located in a caliper body, and configured to be rotatable; a pair of nut parts configured to cover outsides of the respective screw bars, engaged with the respective screw bars, and selectively moved toward a brake pad or moved to an opposite side of the brake pad, depending on a rotation direction of the screw bars; a pair of piston parts moved with the nut parts, and configured to cover the respective nut parts and apply pressure to the brake pad when pressed by the nut parts or remove the pressure applied to the brake pad when a pressing of the nut parts is removed; and a pair of position adjusters movably coupled to the caliper body, bought into contact with the pair of nut parts, respectively, and moved on the caliper body toward the brake pad or moved to the opposite side of the brake pad to adjust a position of at least one of the pair of nut parts.

One of the position adjusters may have a first screw thread provided on an outside thereof, and the caliper body may have a second screw thread engaged with the first screw thread.

One of the nut parts may include: a nut body engaged with the respective screw bar; and a nut block connected to the nut body, and brought into contact with the respective position adjuster.

The respective position adjuster may have an insertion groove into which the nut block is inserted.

In accordance with the embodiment of the present disclosure, the brake apparatus for a vehicle may improve the return forces of the piston parts through the elastic restoring forces of the elastic springs when a braking force is removed. Furthermore, as the brake disk and the brake pad are perfectly spaced apart from each other, drag torque may be reduced.

Furthermore, when the elastic spring is mounted on the outside of the piston part, the elastic spring may be more easily mounted through the spring retainer.

Furthermore, as the positions of the nut parts are adjusted through the position adjusters, the pair of piston parts may be located on the same line. Thus, during a braking operation, surface pressures applied to the brake pads through the piston parts may be uniformized to improve the braking force.

Furthermore, as the position adjuster comes into contact with the nut part so as to restrict the rotation of the nut part, the rotation of the nut part may be prevented and the linear motion of the nut part may be secured, when a braking operation is performed and released.

BRIEF DESCRIPTION OF THE DRAWINGS

FIG. 6 is seen from a different side.

DETAILED DESCRIPTION OF THE ILLUSTRATED EMBODIMENTS

Hereinafter, a brake apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
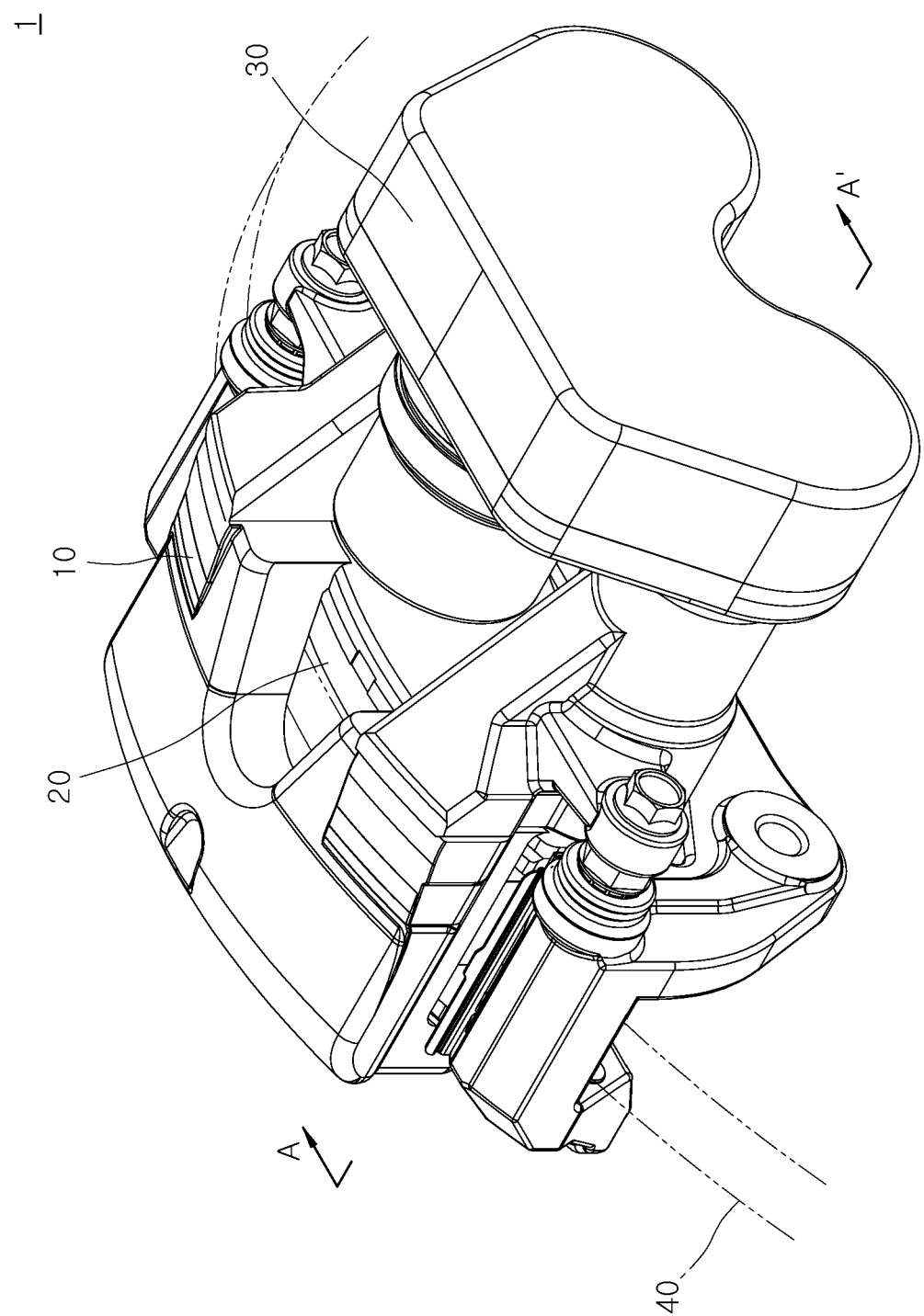
FIG. 1 is a perspective view of a brake apparatus for a vehicle in accordance with an embodiment of the present disclosure.
Figure 2:
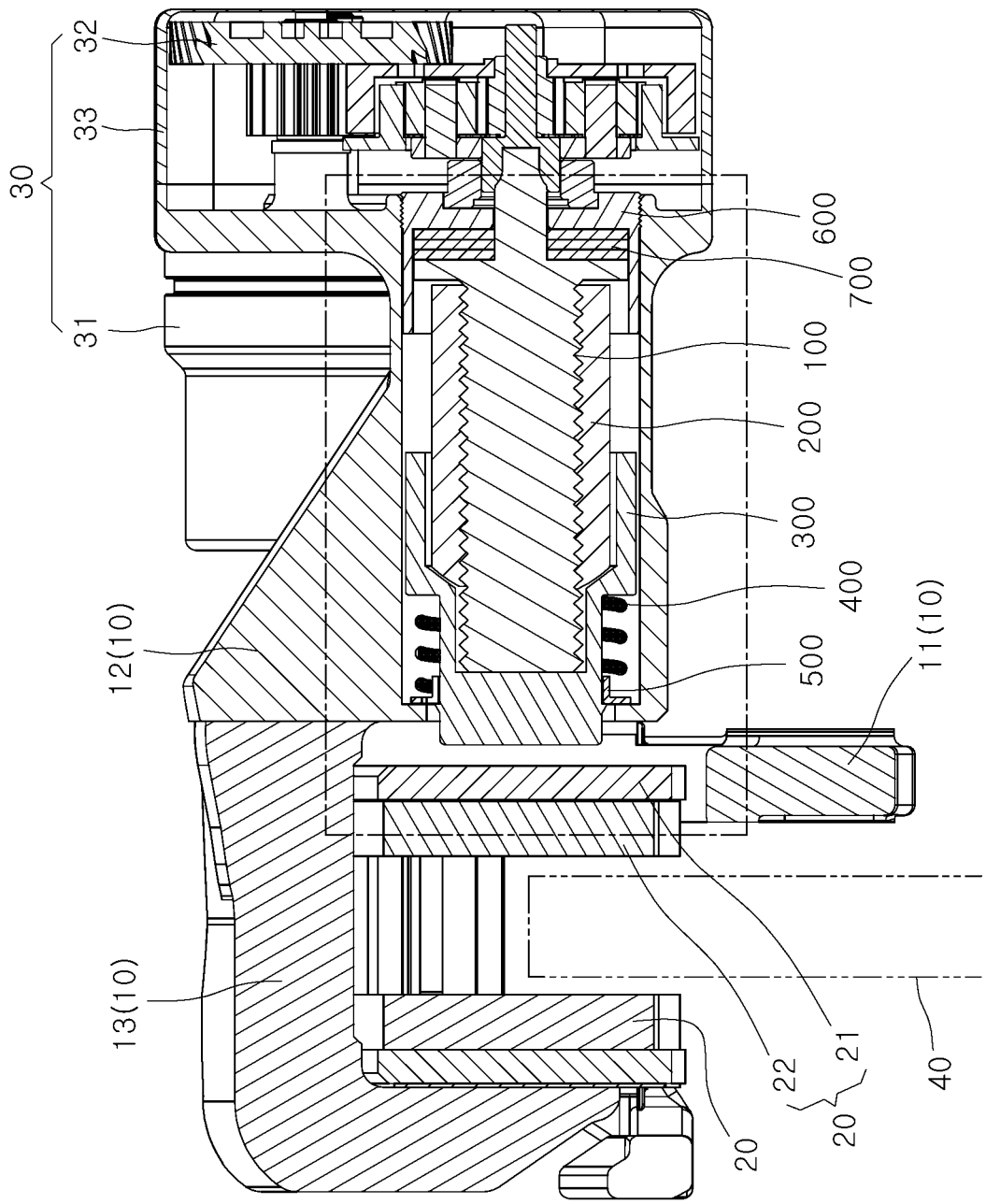
FIG. 2 is a cross-sectional view taken along line A-A' of FIG. 1.
Figure 3:
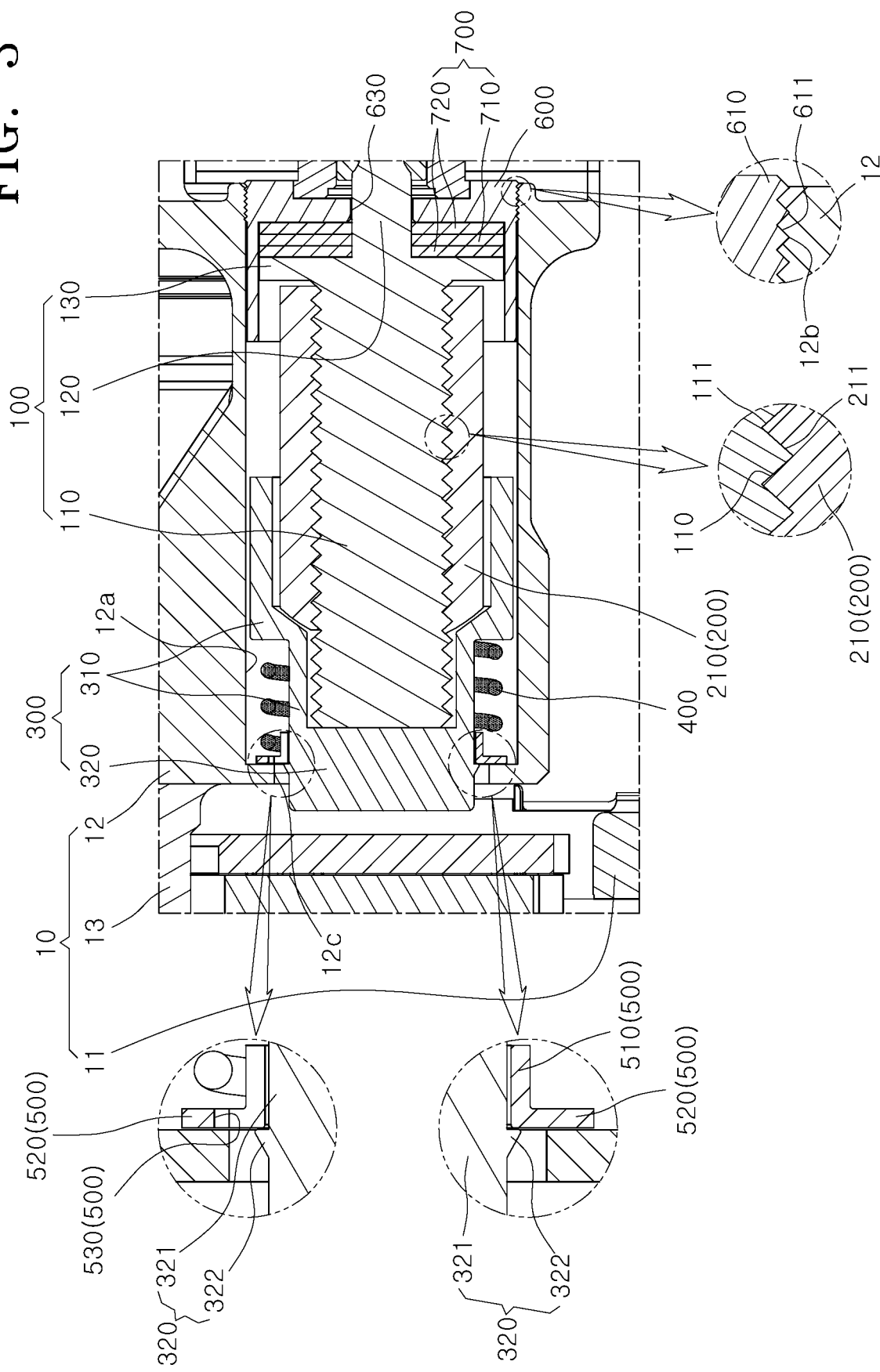
FIG. 3 is an expanded view of main parts in FIG. 2.
Figure 4:
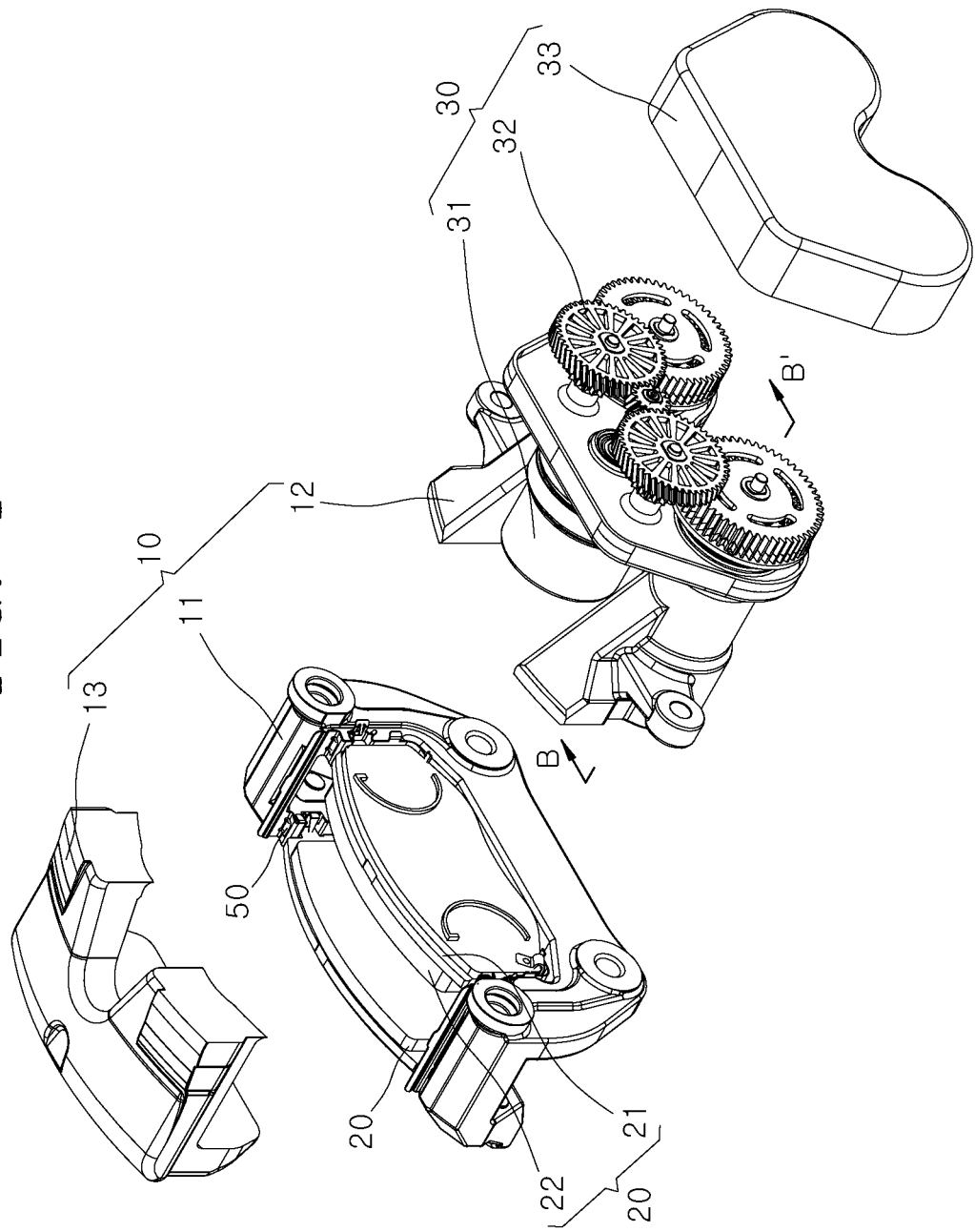
FIG. 4 is an exploded perspective view of the brake apparatus for a vehicle in accordance with the embodiment of the present disclosure.
Figure 5:
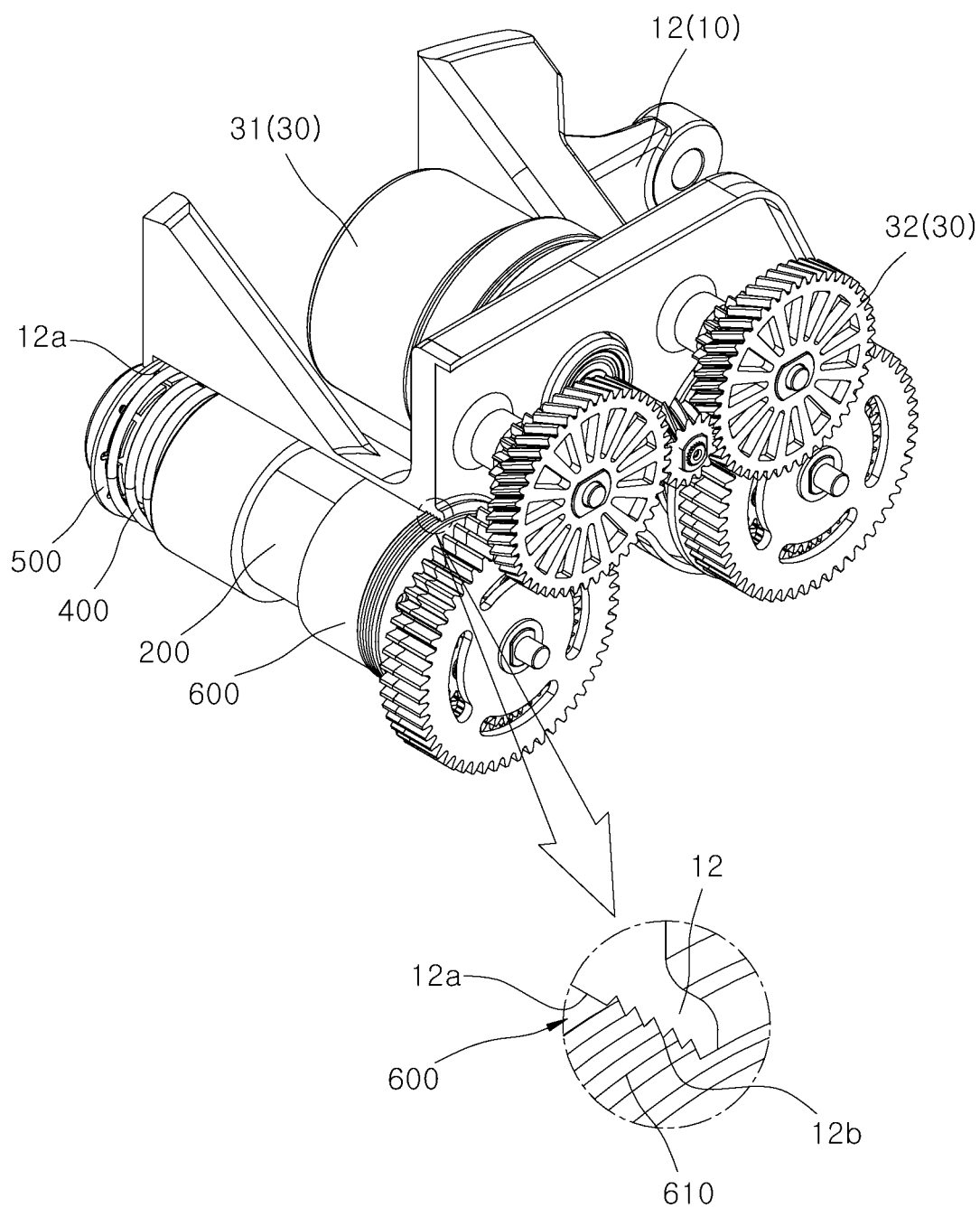
FIG. 5 is a semi-cross-sectional taken along line B-B' of FIG. 4.
Figure 6:
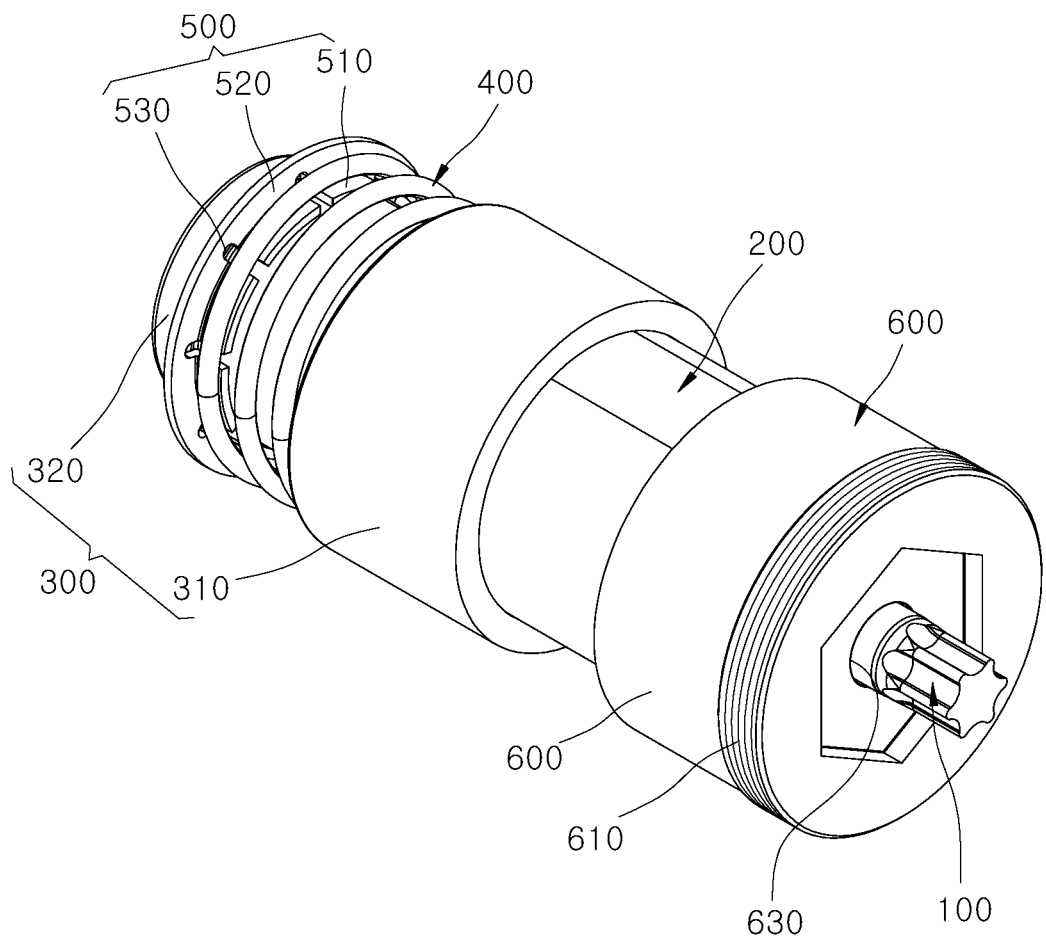
FIG. 6 is a perspective view of main parts in FIG. 5.
Figure 7:
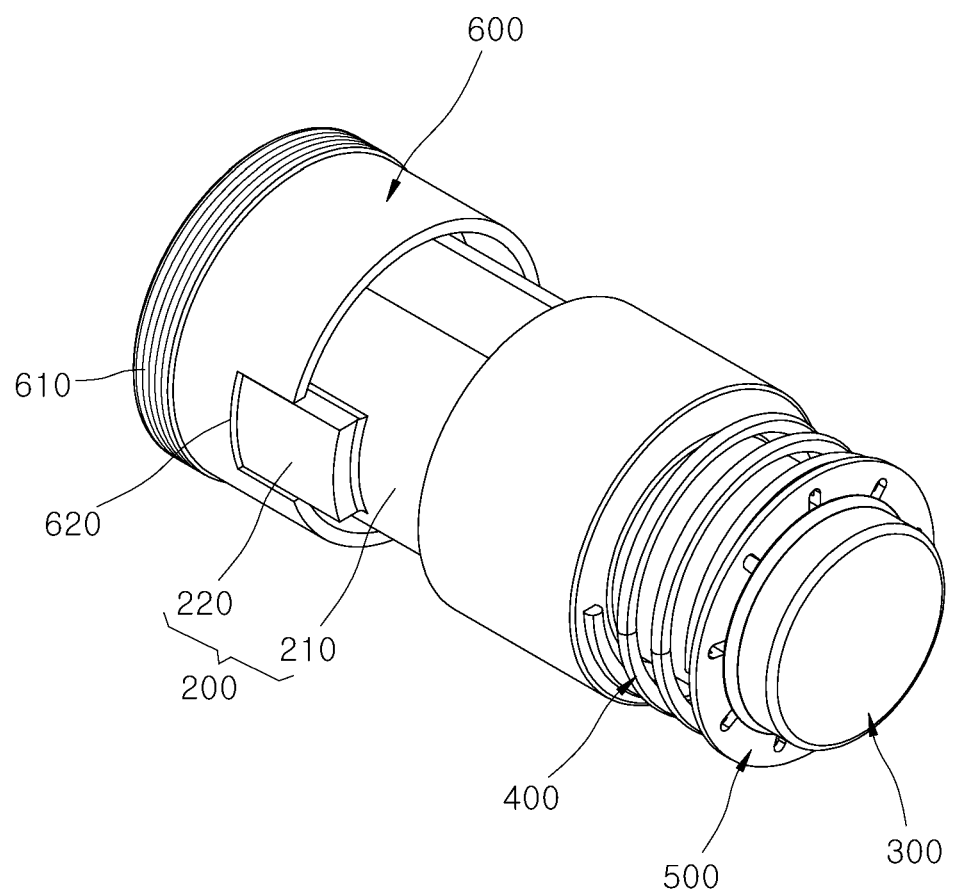
FIG. 7 is a perspective view of the main parts when
Figure 8:
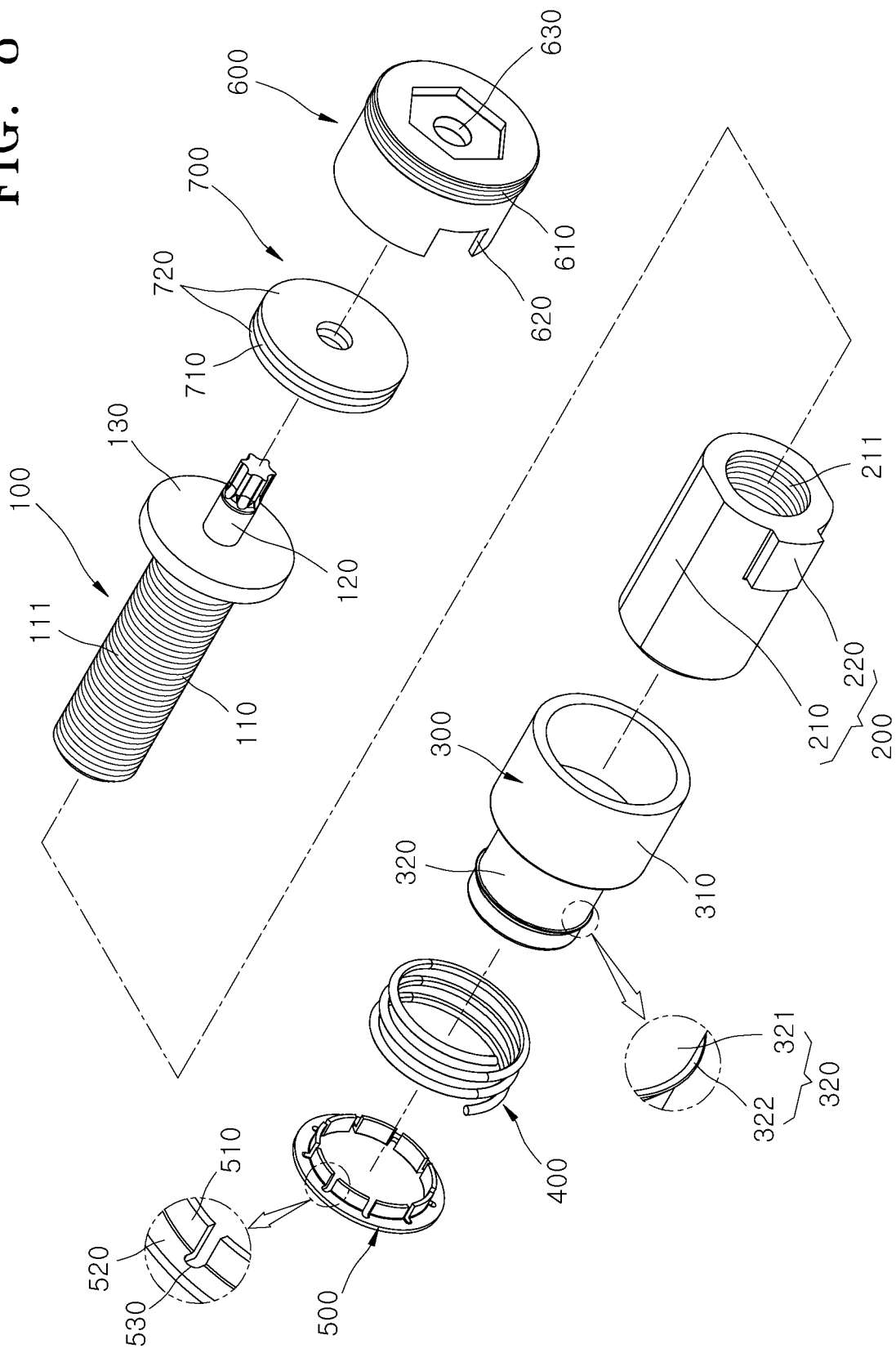
FIG. 8 is an exploded perspective view of FIG. 7.
Figure 9A:
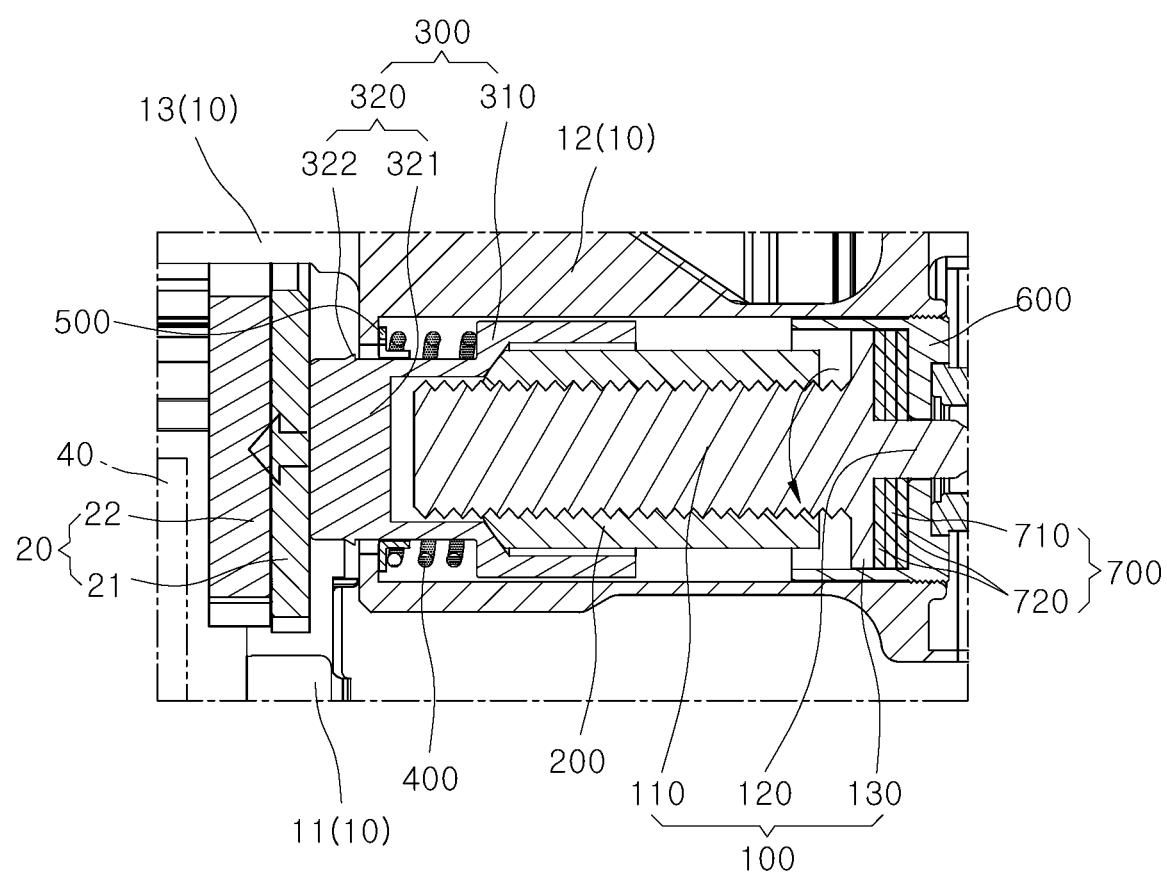
FIGS. 9A and 9B are diagrams illustrating an operation of the brake apparatus for a vehicle in accordance with the embodiment of the present disclosure.
Figure 9B:
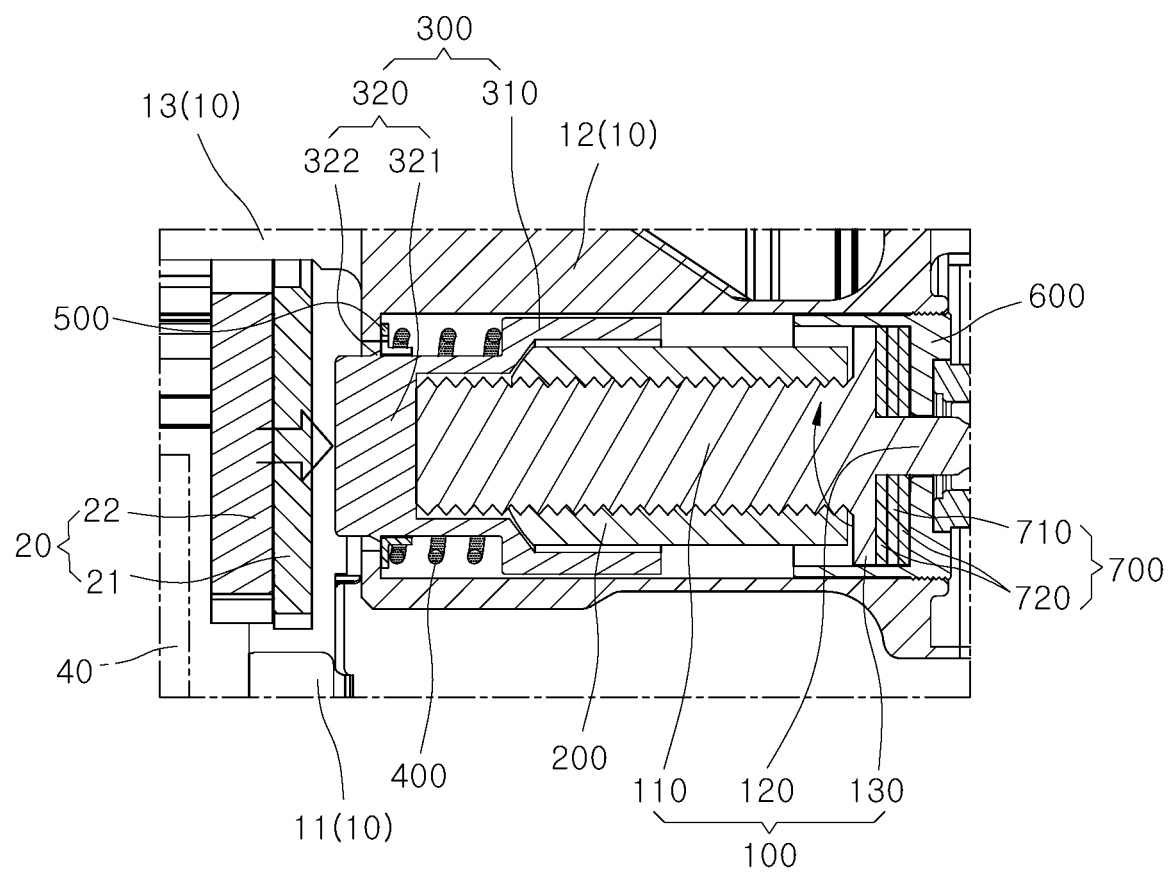
Figure 10A:
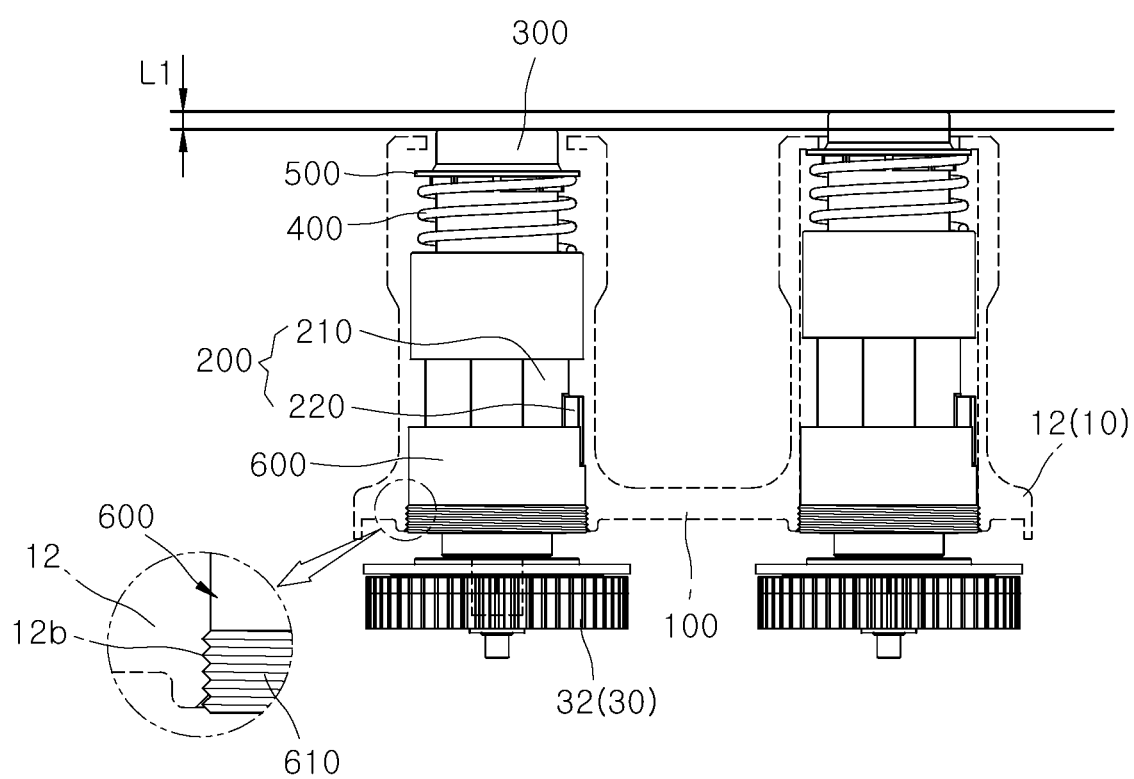
FIGS. 10A and 10B are diagrams illustrating that a position adjuster of the brake apparatus for a vehicle in accordance with the embodiment of the present disclosure is operated.
Figure 10B:
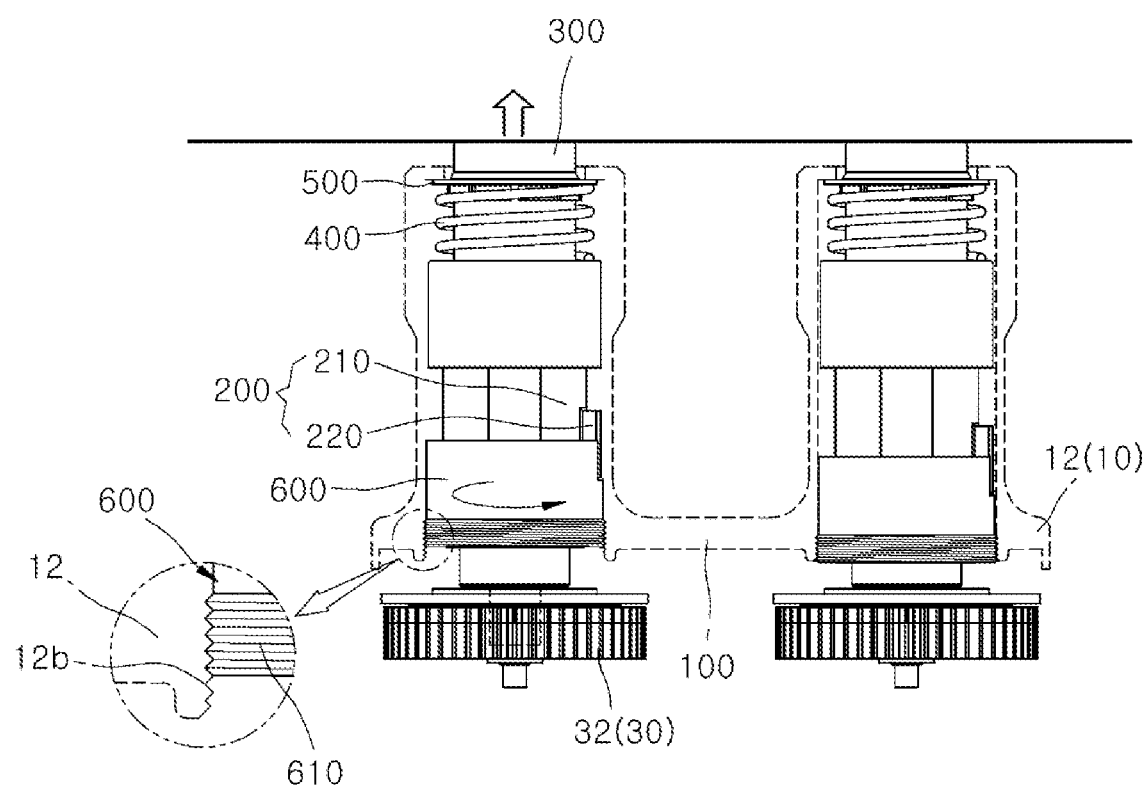

FIG. 1 is a perspective view of a brake apparatus for a vehicle in accordance with an embodiment of the present disclosure, FIG. 2 is a cross-sectional view taken along line A-A' of FIG. 1, FIG. 3 is an expanded view of main parts in FIG. 2, FIG. 4 is an exploded perspective view of the brake apparatus for a vehicle in accordance with the embodiment of the present disclosure, FIG. 5 is a semi-cross-sectional taken along line B-B' of FIG. 4, FIG. 6 is a perspective view of main parts in FIG. 5, FIG. 7 is a perspective view of the main parts when FIG. 6 is seen from a different side, FIG. 8 is an exploded perspective view of FIG. 7, FIGS. 9A and 9B are diagrams illustrating an operation of the brake apparatus for a vehicle in accordance with the embodiment of the present disclosure, and FIGS. 10A and 10B are diagrams illustrating that a position adjuster of the brake apparatus for a vehicle in accordance with the embodiment of the present disclosure is operated.

Referring to FIGS. 1 to 8, a brake apparatus 1 for a vehicle in accordance with an embodiment of the present disclosure includes a pair of screw bars 100, a pair of nut parts 200, a pair of piston parts 300, a pair of elastic springs 400, a spring retainer 500, a position adjuster 600, and a bearing part 700. The pair of screw bars 100 are located in a caliper body 10, and rotated by power received from a power unit 30. The caliper body 10 includes a first caliper body 11, a second caliper body 12, and a third caliper body 13. The first caliper body 11 has brake pads 20 disposed therein so as to face each other. In this case, a pad liner 50 is mounted on the first caliper body 11, and returns the brake pads 20 to the original positions by using an elastic restoring force, when the brake is released.

The second caliper body 12 is connected to the first caliper body 11, and has an installation hole 12a formed therein, such that the power unit 30, the pair of screw bars 100, the pair of nut parts 200, the pair of piston parts 300, the pair of elastic springs 400, and the spring retainer 500 are mounted in the installation hole 12a. The third caliper body 13 may be connected to the second caliper body 12 while covering the first caliper body 11.

For example, the power unit 30 includes a motor 31, a gear module 32, and a case 33. The gear module 32 includes a plurality of gears (not illustrated), and any one of the plurality of gears is connected to the motor 31 and the other is connected to the screw bar 100. The gear module 32 receives a rotational force from the motor 31, and rotates the screw bars 100. The gear module 32 is disposed in the case 33, and the motor 31 is mounted in the case 33. The case 33 is coupled to the second caliper body 12 of the caliper body 10.

The pair of screw bars 100 are formed in a rod shape and inserted into the pair of nut parts 200, respectively. The screw bars 100 each have a male screw thread 111 formed on the outside thereof, and are rotated by a rotational force received from the motor 31.

The pair of nut parts 200 cover the outsides of the screw bars 100, and are engaged with the screw bars 100, respectively. According to the rotation direction of the screw bars 100, the pair of nut parts 200 are selectively moved toward the brake pad 20 or moved to the opposite side of the brake pad 20. The nut parts 200 each have a female screw thread 211 formed on the inner surface thereof and engaged with the male screw thread 111 of the screw bar 100.

Specifically, when the screw bar 100 is rotated in a preset direction, the nut part 200 is moved toward the brake pad 20, while a rotational motion of the screw bar 100 is converted into a linear motion. On the contrary, when the screw bar 100 is rotated in the opposite direction of the preset direction, the nut part 200 is moved to the opposite side of the brake pad 20.

The pair of piston parts 300 cover the respective nut parts 200, and are moved with the nut parts 200. The pair of piston parts 300 apply pressure to the brake pads 20 when pressed by the nut parts 200, or remove the pressure applied to the brake pads 20 when released from the nut parts 200. The piston parts 300 are moved toward the brake pads 20 when pressed by the nut parts 200, or moved to the opposite side of the brake pads 20 when released from the nut parts 200.

Specifically, the brake pad 20 includes a back plate 21 and a friction member 22. The back plate 21 is disposed so as to face the piston part 300, and pressed by the piston part 300.

The friction member 22 is coupled to a surface of the back plate 21, facing a brake disk 40. The friction member 22 is contactable with the brake disk 40.

When the pair of piston parts 300 press the brake pads 20, the brake pads 20 are brought into contact with the brake disk 40 to generate a braking force. That is, when the piston part 300 presses the back plate 21 of the brake pad 20, the friction member 22 of the brake pad 20 is brought into contact with the brake disk 40. The piston part 300 is formed in a cylindrical shape, and has an opening formed in the direction that the nut part 200 is inserted, and a closed portion facing the brake pad 20.

The pair of elastic springs 400 are installed on the respective piston parts 300, and have an elastic restoring force to return the piston parts 300 to the original positions. The elastic spring 400 is installed so as to cover the outside of the piston part 300, and elastically deformed and compressed by the pressure of the piston part 300 which is moved toward the brake pad 20. On the contrary, when the pressure of the piston part 300 is removed, the elastic spring 400 provides an elastic restoring force to the piston part 300 while restored to the original state by the elastic restoring force. Then, the piston part 300 is returned to the original position.

The spring retainer 500 is mounted on each of the piston parts 300, and brought into contact with the elastic spring 400 (see FIG. 3). Thus, the elastic spring 400 is prevented from separating from the piston part 300. As a result, when the elastic spring 400 is mounted on the outside of the piston part 300, the elastic spring 400 may be more easily mounted through the spring retainer 500.

The spring retainer 500 is made of an elastic material, and includes a plurality of slots 530. The plurality of slots 530 are formed on the spring retainer 500 so as to be spaced apart from each other in a circumferential direction. Therefore, since the spring retainer 500 can be easily elastically deformed, an operator may mount the spring retainer 500 on the piston part 300 with more ease.

The spring retainer 500 includes a first spring retainer 510, a second spring retainer 520, and the slots 530 (see FIGS. 5 to 8). The first spring retainer 510 is formed in a ring shape, made of an elastic material, and mounted on the piston part 300. The second spring retainer 520 is extended from the first spring retainer 510 so as to be bent to the outside, and comes into contact with the elastic spring 400. The second spring retainer 520 is also made of an elastic material. The slots 530 are formed on the first and second spring retainers 510 and 520 so as to be spaced apart from each other in the circumferential direction.

The position adjuster 600 is provided as a pair of position adjusters 600 which are movably coupled to the caliper body 10, and brought into contact with the pair of nut parts 200, respectively. Furthermore, the position adjuster 600 is moved on the caliper body 10 toward the brake pad 20 or moved to the opposite side of the brake pad 20, such that the position of at least one of the pair of nut parts 200 is adjusted. That is, the position adjuster 600 may adjust the positions of the pair of piston parts 300 by adjusting the position of at least one of the pair of nut parts 200. The position adjuster 600 is operated to locate the pair of piston parts 300 on the same line.

The position adjuster 600 is formed in a cylindrical shape, has an opening formed in the direction that the nut part 200 is inserted, and comes into contact with the nut part 200 inserted therein. The position adjuster 600 has a screw hole 630 through which a second screw bar 120 of the screw bar 100 passes.

Specifically, the position adjuster 600 is screwed to the caliper body 10, and moved on the caliper body 10 toward the brake pad 20 when rotated in a preset direction, and the nut part 200 is moved toward the brake pad 20 while rotated in the same direction with the position adjuster 600, and presses the piston part 300 such that a protruding amount of the piston part 300 to the outside of the caliper body 10 is increased.

On the contrary, the position adjuster 600 is moved on the caliper body 10 to the opposite side of the brake pad 20 when rotated in the opposite direction of the preset direction, and the nut part 200 is moved to the opposite side of the brake pad 20 while rotated in the same direction with the position adjuster 600, and releases the piston part 300 such that the protruding amount of the piston part 300 to the outside of the caliper body 10 is decreased.

The bearing part 700 covers the outside of the screw bar 100, and is disposed in the nut part 200. The bearing part 700 includes a bearing 710 and a bearing plate 720. The bearing 710 covers the outside of the screw bar 100, such that the screw bar 100 is smoothly rotated. The bearing plate 720 is disposed on either side of the bearing 710, and supports the bearing 710.

The screw bar 100 includes a first screw bar 110, the second screw bar 120, and a third screw bar 130. The first screw bar 110 is engaged with the nut part 200. The first screw bar 110 is formed in a pillar shape, and has the male screw thread 111 formed on an outer surface thereof and engaged with the female screw thread 211.

The second screw bar 120 is connected to the first screw bar 110 and the power unit 30, and the nut part 200 and the position adjuster 600 cover the outside of the second screw bar 120. The second screw bar 120 is formed in a pillar shape, and has one end connected to the first screw bar 110 and the other end connected to the power unit 30.

The third screw bar 130 is extended from the circumference of the second screw bar 120 to the outside, and faces the bearing part 700. The third screw bar 130 is formed in a ring shape, and faces the bearing plate 720 of the bearing part 700.

The piston part 300 includes a piston body 310 and a piston protrusion 320. The piston body 310 covers the outsides of the screw bar 100 and the nut part 200.

The piston protrusion 320 is connected to the piston body 310, presses the brake pad 20, and has the spring retainer 500 mounted on the outside thereof. At this time, the piston protrusion 320 covers the outside of the screw bar 100.

The piston protrusion 320 includes a piston protrusion body 321 and a piston protrusion step 322. The piston protrusion body 321 is connected to the piston body 310, and the spring retainer 500 covers the outside of the piston protrusion body 321. The piston protrusion body 321 covers the outside of the screw bar 100. The piston protrusion step 322 protrudes from the circumference of the piston protrusion body 321 to the outside, and comes into contact with the spring retainer 500.

The position adjuster 600 has a first screw thread 610 formed on the outside thereof, and the caliper body 10 has a second screw thread 12b engaged with the first screw thread 610. The second screw thread 12b is formed on the installation hole 12a of the second caliper body 12. That is, the position adjuster 600 is screwed to the installation hole 12a formed in the second caliper body 12 of the caliper body 10. Thus, when the position adjuster 600 is rotated in a preset direction, the nut part 200 is moved toward the brake pad 20, and the position of the piston part 300 is adjusted close to the brake pad 20. On the contrary, when the position adjuster 600 is rotated in the opposite direction of the preset direction, the nut part 200 is moved to the opposite side of the brake pad 20, and the position of the piston part 300 is adjusted away from the brake pad 20.

The nut part 200 includes a nut body 210 and a nut block 220. The nut body 210 is engaged with the screw bar 100. The nut body 210 has the female screw thread 211 formed on the inner surface thereof and engaged with the male screw thread 111 of the screw bar 100.

The nut block 220 is connected to the nut body 210, and brought into contact with the position adjuster 600. The nut block 220 protrudes from a side portion of the nut body 210 to the outside, such that the movement of the nut block 220 is restricted by an insertion groove 620 of the position adjuster 600.

The position adjuster 600 has the insertion groove 620 into which the nut block 220 is inserted. At this time, even when the braking operation of the brake apparatus 1 for a vehicle is performed or released, the nut block 220 is located in the insertion groove 620. Furthermore, as illustrated in FIG. 7, the shapes and sizes of the nut block 220, the position adjuster 600, and the insertion groove 620 may be varied in design, as long as the nut block 220 of the nut part 200 is located in the insertion groove 620 of the position adjuster 600. Thus, the nut part 200 may be prevented from rotating, while the linearity of the nut part 200 is secured.

Hereafter, the operation and effect of the brake apparatus for a vehicle in accordance with the embodiment of the present disclosure will be described with reference to FIGS. 9A, 9B, 10A and 10B.

As illustrated in FIGS. 9A and 9B, when a braking force is generated by the brake apparatus 1 for a vehicle, the screw bar 100 receiving power from the power unit 30 is rotated in a preset direction, and the nut part 200 engaged with the screw bar 100 is moved toward the piston part 300 while rotated in the preset direction.

The nut part 200 comes into contact with the inside of the piston part 300, and presses the piston part 300 toward the brake pad 20. Thus, the piston part 300 may press the brake pad 20, such that a braking force is generated while the brake pad 20 is brought into contact with the brake disk 40. At this time, the elastic spring 400 covering the outside of the piston part 300 is elastically deformed and compressed while pressed by the piston part 300 moved toward the brake pad 20. The spring retainer 500 is located while supported by the caliper body 10, such that the movement thereof is restricted by the caliper body 10.

When the braking force is released, the screw bar 100 is rotated in the opposite direction of the preset direction. Then, the nut part 200 engaged with the screw bar 100 is moved to the opposite side of the brake pad 20 while moved in the opposite direction of the preset direction. At this time, the elastic spring 400 provides an elastic restoring force to the piston part 300 while restored to the original state. Thus, the piston part 300 is rapidly returned to the original position. As a result, the piston part 300 is perfectly spaced apart from the brake pad 20, such that the pressed brake pad 20 is released. That is, the braking force is completely removed while the brake pad 20 does not come into contact with the brake disk 40.

Referring to FIG. 10A, the pair of piston parts 300 may not be located on the same line due to an error in product design or the like, when the brake apparatus 1 for a vehicle is assembled. Therefore, a distance L occurs between the pair of piston parts 300. As such, when the pair of piston parts 300 are not located on the same line, surface pressures applied to the brake pad 20 through the piston parts 300 may be non-uniformized during a braking operation.

Therefore, when at least one of the pair of position adjusters 600 is rotated in a preset direction and moved on the caliper body 10 toward the brake pad 20 or rotated in the opposite direction of the preset direction and moved on the caliper body 10 to the opposite side of the brake pad 20 as illustrated in FIG. 10B, the position of at least one of the pair of piston parts 300 is adjusted while the nut part 200 is moved toward the brake pad 20 or the opposite side of the brake pad 20. Thus, the pair of piston parts 300 may be located on the same line.

As a result, during the braking operation of the brake apparatus 1 for a vehicle, surface pressures applied to the brake pad 20 through the piston parts 300 may be uniformized, which makes it possible to improve the braking force.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, comprising:
   a pair of screw bars located in a caliper body, and configured to be rotatable;
   a pair of nut parts configured to cover outsides of the respective screw bars, engaged with the respective screw bars, and selectively moved toward a brake pad or moved to an opposite side of the brake pad, depending on a rotation direction of the screw bars;
   a pair of piston parts moved with the nut parts, and configured to cover the respective nut parts and apply pressure to the brake pad when pressed by the nut parts or remove the pressure applied to the brake pad when a pressing of the nut parts is removed;
   an elastic spring installed on each of the piston parts, and configured to apply an elastic restoring to cause the piston part to return to an original position; and
   a spring retainer mounted on each of the piston parts, and brought into contact with the elastic spring,
   wherein one of the piston parts comprises:
   a piston body configured to cover the outsides of the respective screw bar and the respective nut part; and
   a piston protrusion connected to the piston body, configured to press the brake pad, and having the spring retainer mounted on an outside thereof.

2. The brake apparatus of claim 1, wherein the piston protrusion comprises:
   a piston protrusion body connected to the piston body, and having an outside covered by the spring retainer; and
   a piston protrusion step protruding from a circumference of the piston protrusion body to an outside, and brought into contact with the spring retainer.

3. The brake apparatus of claim 1, wherein the spring retainer is made of an elastic material, and has a plurality of slots.

4. The brake apparatus of claim 1, further comprising a pair of position adjusters movably coupled to the caliper body, brought into contact with the pair of nut parts, respectively, and moved on the caliper body toward the brake pad or moved to the opposite side of the brake pad to adjust a position of at least one of the pair of nut parts.

5. The brake apparatus of claim 4, wherein one of the position adjusters has a first screw thread provided on an outside thereof, and the caliper body has a second screw thread engaged with the first screw thread.

6. The brake apparatus of claim 5, wherein one of the nut parts comprises:

a nut body engaged with the respective screw bar; and a nut block connected to the nut body, and brought into contact with the respective position adjuster.

7. The brake apparatus of claim 6, wherein the respective position adjuster has an insertion groove into which the nut block is inserted.

8. A brake apparatus for a vehicle, comprising:

a pair of screw bars located in a caliper body, and configured to be rotatable;

a pair of nut parts configured to cover outsides of the respective screw bars, engaged with the respective screw bars, and selectively moved toward a brake pad or moved to an opposite side of the brake pad, depending on a rotation direction of the screw bars;

a pair of piston parts moved with the nut parts, and configured to cover the respective nut parts and apply pressure to the brake pad when pressed by the nut parts or remove the pressure applied to the brake pad when a pressing of the nut parts is removed;

an elastic spring installed on each of the piston parts, and configured to apply an elastic restoring to cause the piston part to return to an original position;

a spring retainer mounted on each of the piston parts, and brought into contact with the elastic spring; and a pair of position adjusters movably coupled to the caliper body, brought into contact with the pair of nut parts, respectively, and moved on the caliper body toward the brake pad or moved to the opposite side of the brake pad to adjust a position of at least one of the pair of nut parts.

9. The brake apparatus of claim 8, wherein one of the position adjusters has a first screw thread provided on an outside thereof, and the caliper body has a second screw thread engaged with the first screw thread.

10. The brake apparatus of claim 9, wherein one of the nut parts comprises:

a nut body engaged with the respective screw bar; and a nut block connected to the nut body, and brought into contact with the respective position adjuster.

11. The brake apparatus of claim 10, wherein the respective position adjuster has an insertion groove into which the nut block is inserted.

12. The brake apparatus of claim 8, wherein the spring retainer is made of an elastic material, and has a plurality of slots.

* * * * *